United States Patent
Sodhi

(10) Patent No.: US 11,198,478 B2
(45) Date of Patent: Dec. 14, 2021

(54) INTEGRATED TAILGATE HINGE AND STRIKER ASSEMBLY

(71) Applicant: Honda Motor Co., Ltd., Tokyo (JP)

(72) Inventor: Deepamar Singh Sodhi, Moody, AL (US)

(73) Assignee: Honda Motor Co., Ltd., Tokyo (JP)

( * ) Notice: Subject to any disclaimer, the term of this patent is extended or adjusted under 35 U.S.C. 154(b) by 144 days.

(21) Appl. No.: 16/686,515

(22) Filed: Nov. 18, 2019

(65) Prior Publication Data

US 2021/0147007 A1    May 20, 2021

(51) Int. Cl.
*B62D 33/02* (2006.01)
*B60J 5/10* (2006.01)
*E05D 7/12* (2006.01)
*B62D 33/027* (2006.01)

(52) U.S. Cl.
CPC .......... *B62D 33/0273* (2013.01); *B60J 5/108* (2013.01); *E05D 7/121* (2013.01); *E05Y 2900/546* (2013.01)

(58) Field of Classification Search
CPC .......... B62D 33/0273; E05Y 2900/543; E05D 7/121; B60J 5/108
See application file for complete search history.

(56) References Cited

U.S. PATENT DOCUMENTS

| | | | |
|---|---|---|---|
| 7,150,486 B2* | 12/2006 | Ichinose | B60P 1/26 296/51 |
| 7,281,747 B2 | 10/2007 | Austin | |
| 7,481,479 B1 | 1/2009 | Townson et al. | |
| 2009/0250960 A1 | 10/2009 | Townson et al. | |
| 2012/0324793 A1 | 12/2012 | Abbasi et al. | |

FOREIGN PATENT DOCUMENTS

| | | |
|---|---|---|
| CN | 204567238 U | 8/2015 |
| DE | 102015013316 A1 | 4/2017 |
| FR | 2924076 B1 | 5/2009 |
| KR | 100942100 B1 | 2/2010 |
| WO | 2011163374 A1 | 12/2011 |

* cited by examiner

*Primary Examiner* — D Glenn Dayoan
*Assistant Examiner* — Melissa Ann Bonifazi
(74) *Attorney, Agent, or Firm* — American Honda Motor Co., Inc.; Mark Duell

(57) ABSTRACT

An integrated hinge and striker assembly is affixed to one of a first and second vertically aligned sidewalls of a motor vehicle for connecting a tailgate to the motor vehicle. The integrated hinge and striker assembly includes a hinge base, the hinge base being vertically aligned with a first end portion, a center portion, and a second end portion, a hinge extending from the first end portion of the hinge base, a striker extending from the second end portion of the hinge base, and wherein a vertical axis is defined parallel to the hinge base and running through the striker and the hinge. Integration ensures proper operation of a bi-directional hinge that allows the tailgate to be opened to one of two different open positions.

18 Claims, 8 Drawing Sheets

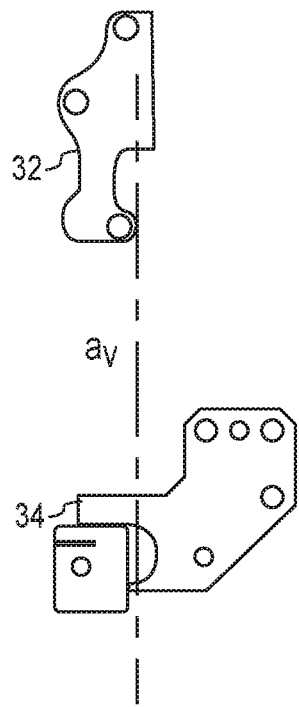 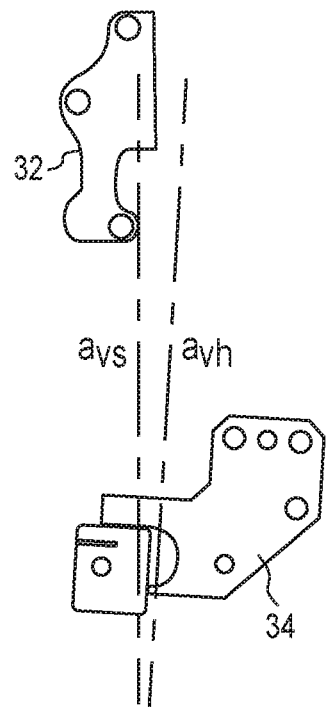 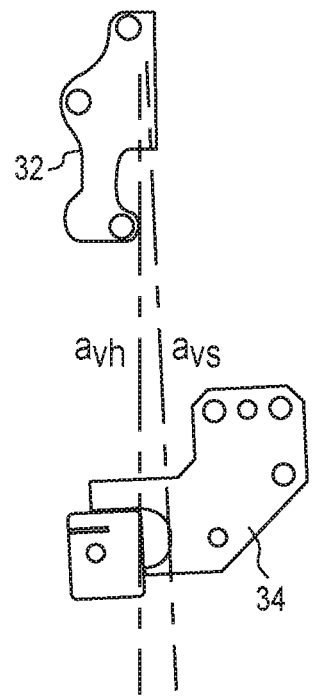
FIG. 4A
(PRIOR ART)
FIG. 4B
(PRIOR ART)
FIG. 4C
(PRIOR ART)

INTEGRATED TAILGATE HINGE AND STRIKER ASSEMBLY

TECHNICAL FIELD

The embodiments described herein are related to the alignment of a striker and a hinge for a tailgate of a motor vehicle.

BACKGROUND

Tailgates may be attached to the vertical walls at the rear of a motor vehicle by at least one hinge and striker. Pitch and rotation of the hinge may not be controlled and may be hard for manufacturing associates to adjust. Vertical pitch of the left side hinge is critical for good operation of both up and down and side-to-side opening and closing of the tailgate. Adjusting left side hinges further may affect the adjustment of the right side hinges and vice versa. Adjustment may also cause gap issues between the tailgate and rear fender area.

There is, therefore, a need for an improved tailgate and hinge assembly that reduces misalignment of the hinges, particularly in relation to the strikers, and to reduce the impact of hinge and striker installation on the manufacturing process.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, an apparatus for attaching a tailgate to a motor vehicle, the motor vehicle having a bed comprising a floor between spaced apart first and second vertically aligned sidewalls, includes an integrated hinge and striker assembly affixed to one of the first and second vertically aligned sidewalls and connecting the tailgate to the motor vehicle.

According to another aspect, a motor vehicle, includes a bed, the bed having first and second vertically aligned sidewalls and a floor spanning between the first and second vertically aligned sidewalls, a tailgate attached to the bed and movable between a closed position and a first open position and between the closed position and a second open position, and an integrated hinge and striker assembly affixed to the first vertically aligned sidewall and connecting the tailgate to first vertically aligned sidewall.

According to yet another aspect, an integrated hinge and striker assembly affixed to one of a first and second vertically aligned sidewalls of a motor vehicle for connecting a tailgate to the motor vehicle includes a hinge base, the hinge base being vertically aligned with a first end portion, a center portion, and a second end portion, a hinge extending from the first end portion of the hinge base, a striker extending from the second end portion of the hinge base, and wherein a vertical axis is defined parallel to the hinge base and running through the striker and the hinge.

BRIEF DESCRIPTION OF THE DRAWINGS

FIGS. 4A, 4B, and 4C are prior art views of arrangements of a hinge and a striker installed on the motor vehicle of FIG. 1.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
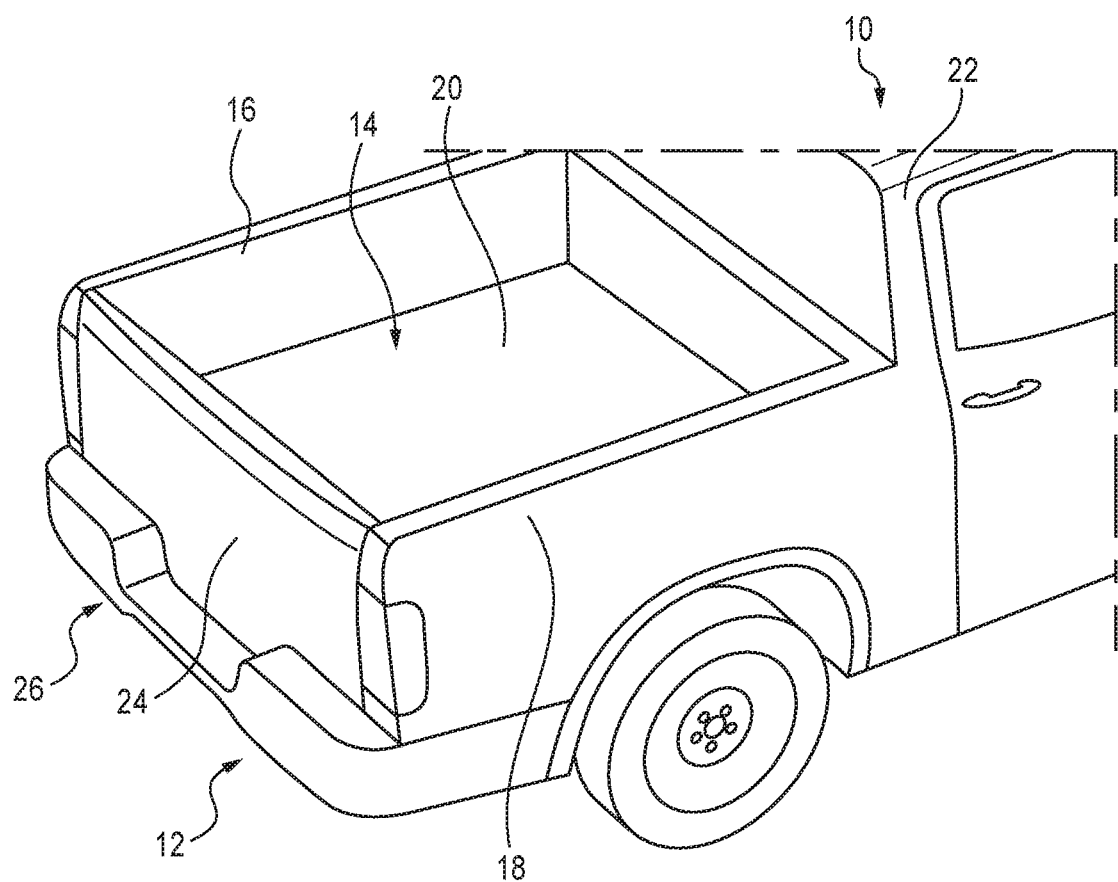
FIG. 1 is rear perspective view of a motor vehicle of the type typically characterized as a pickup truck.
Figure 2:
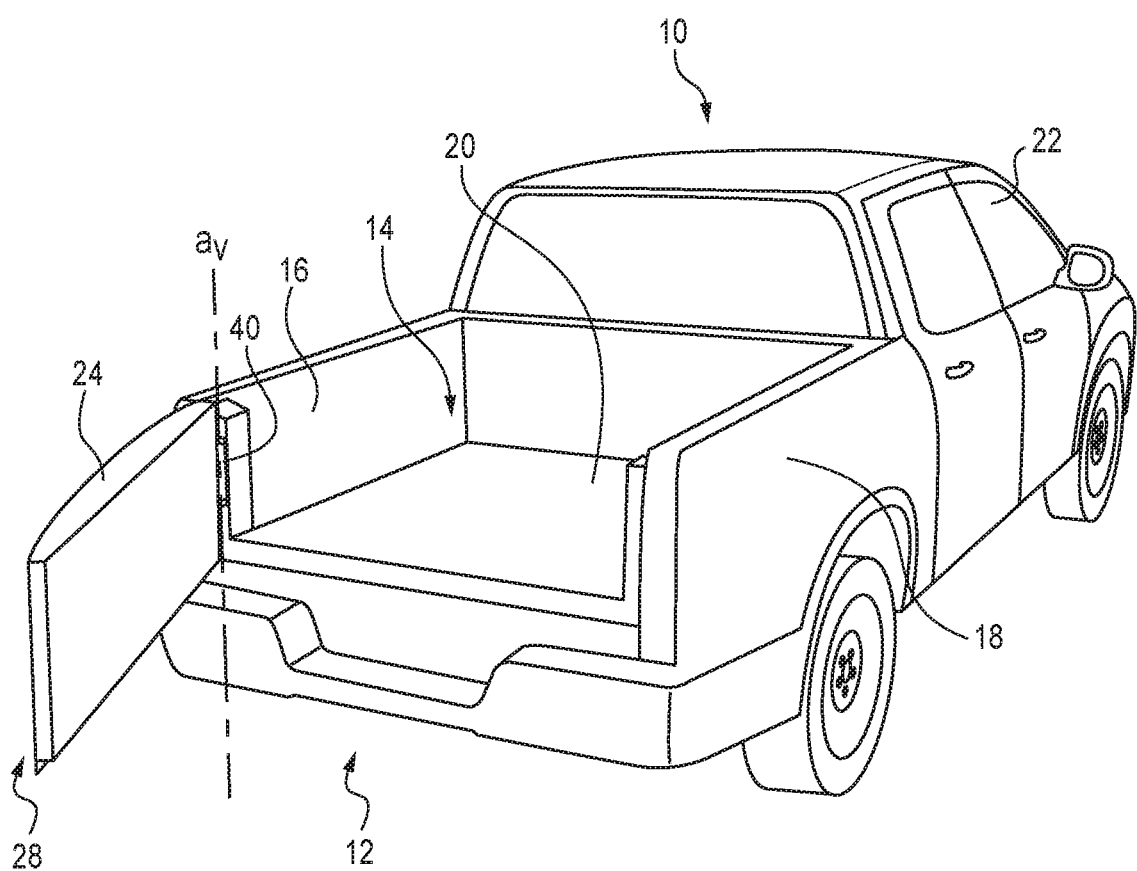
FIG. 2 is a rear perspective view of the motor vehicle of FIG. 1 with a tailgate in a first open position.
Figure 3:
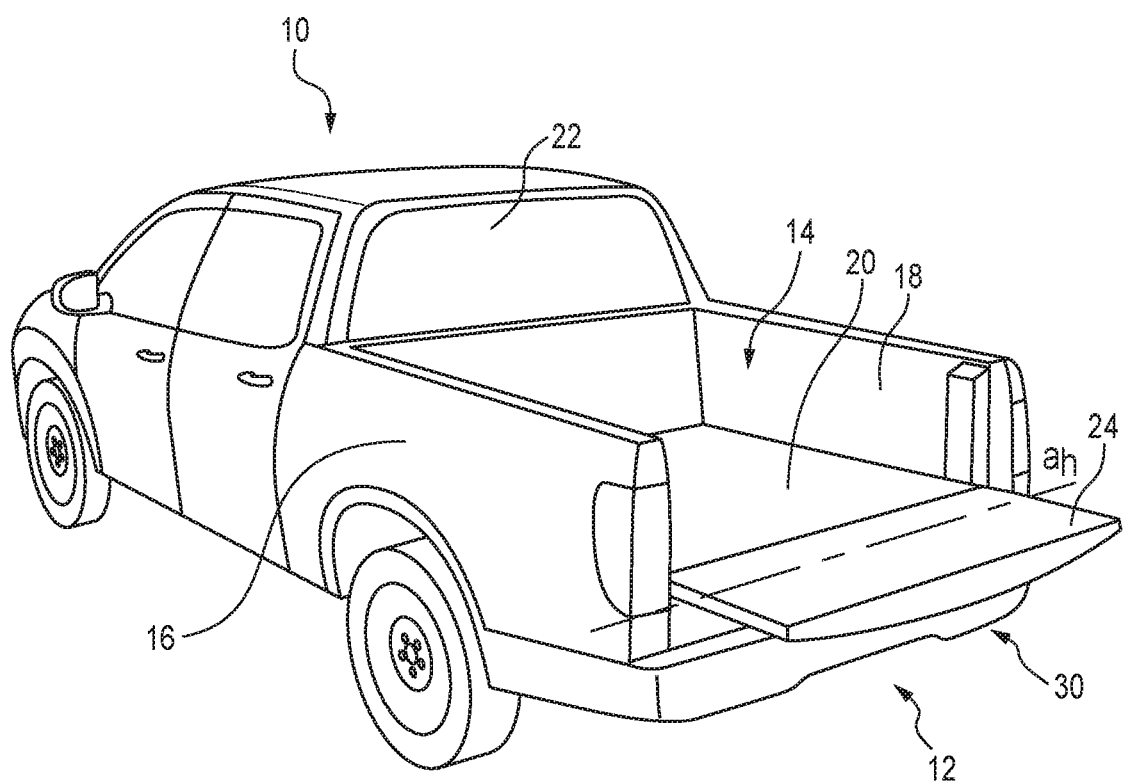
FIG. 3 is a rear perspective view of the motor vehicle of FIG. 1 with the tailgate in a second open position.

FIG. 1 illustrates a rear 12 of a motor vehicle 10, most typically of the type described as a pickup truck, which includes a bed 14. The bed 14 further includes first and second vertically aligned sidewalls 16, 18 and a floor 20 spanning between the first and second vertically aligned sidewalls 16, 18. The first and second vertically aligned sidewalls 16, 18 and the floor 20 extend horizontally and longitudinally rearward of a cabin 22 of the motor vehicle 10. The motor vehicle 10 also includes a tailgate 24 attached to the bed 14 and movable between a closed position 26, as illustrated in FIG. 1 and a first open position 28 as shown in FIG. 2, and between the closed position 26 illustrated in FIG. 1 and a second open position 30 as shown in FIG. 3.

FIGS. 4A, 4B, and 4C illustrate a prior art arrangement for attaching the tailgate 24 to the rear 12 of the motor vehicle 10. The tailgate 24, which is not shown in FIGS. 4A, 4B, and 4C, may be connected to a left side upper striker 32 and a left side lower hinge 34, in which the upper striker 32 and the lower hinge 34 are separate and discrete parts. The tailgate 24 is attached to the left side lower hinge 34, and a latch, not shown, on the tailgate 24 may attach to the upper striker 32 when the tailgate is in the closed position 26. In order for the lower hinge 34 to work properly, proper and precise alignment of the lower hinge 34 and upper striker 32 along a vertical axis $a_v$ is required, as illustrated in FIG. 4A. If not properly aligned, and the vertical axis $a_{vs}$ of the upper striker 32 and the vertical axis $a_{vh}$ of the lower hinge are not aligned, as illustrated in FIGS. 4B and 4C, the tailgate 24 may not attach to the upper striker 32 when closed, which prevents proper closure of the tailgate 24. Therefore, there exists a need to ensure the upper striker 32 and the lower hinge 34 are properly aligned in a manner that is repeatable and efficient in the manufacturing process.

Figure 5:
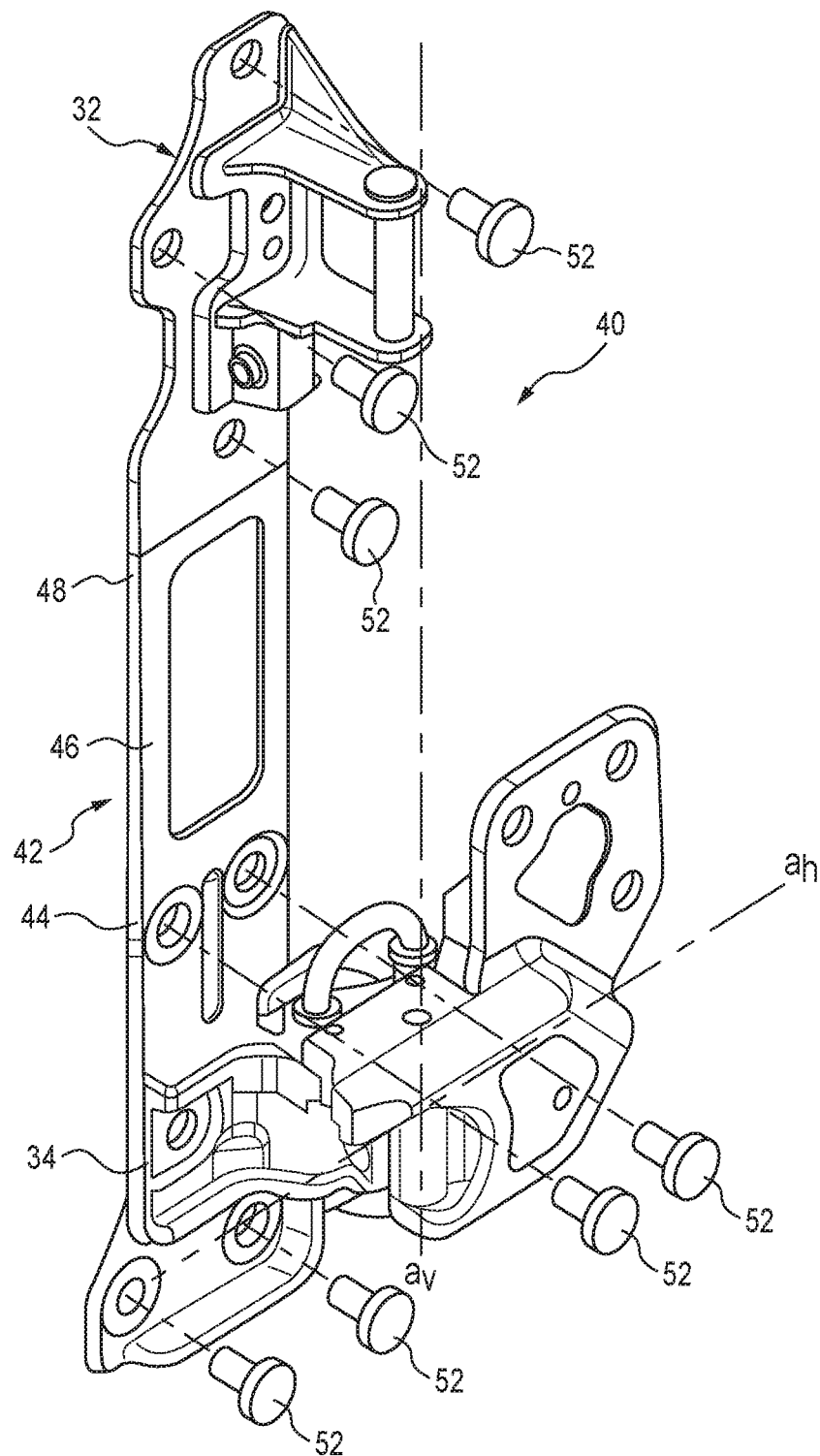
FIG. 5 is an exploded perspective view of an integrated assembly for an upper striker and lower hinge.
Figure 6:
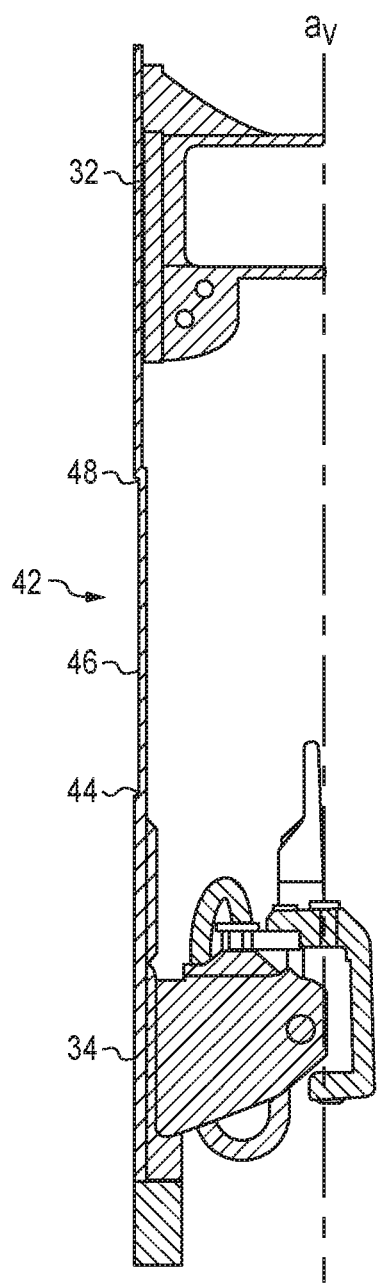
FIG. 6 is a side view of the integrated assembly of FIG. 5.
Figure 7:
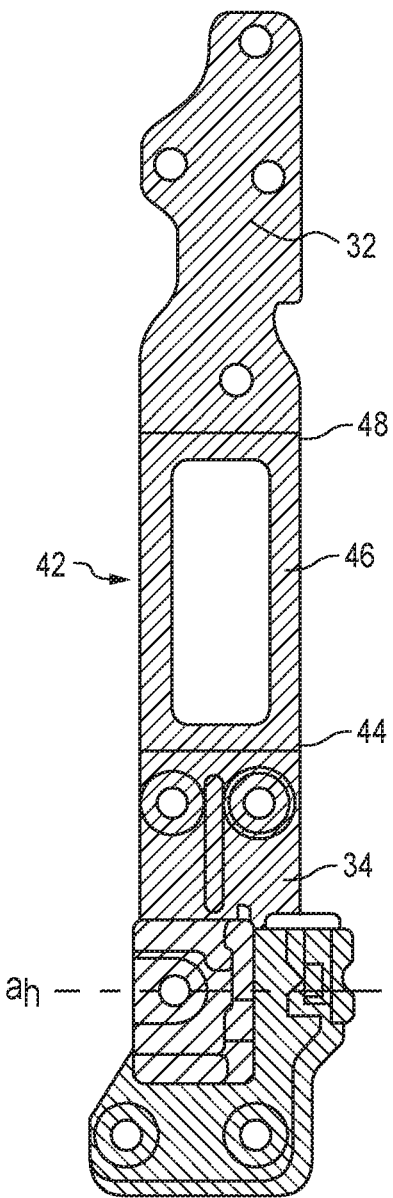
FIG. 7 is a rear view of the integrated assembly of FIG. 5.

FIGS. 5-7 illustrate an integrated upper striker and lower hinge assembly 40, hereinafter "integrated assembly." In the integrated assembly 40, there is provided an upper striker 32 and a lower hinge 34 connected by a hinge base 42. The integration of upper striker 32 and the lower hinge 34 is to maintain a co-axial condition along the vertical axis ay. By integrating the upper striker 32 and lower hinge 34 into an integrated assembly 40, the relationship of the horizontal and vertical axes $a_h$ and $a_v$ of rotation may be controlled within +/−0.15 mm.

Construction and operation of the integrated assembly 40 is further discussed. The bed 40 further includes an integrated assembly 40 affixed to the first vertically aligned sidewall 16 and connecting the tailgate 24 to the first vertically aligned sidewall 16. The integrated assembly 40 includes a hinge base 42 that is vertically aligned and further includes a first end portion 44, a center portion 46, and a second end portion 48. The lower hinge 34 extends from the first end portion 44 of the hinge base 42. The upper striker 32 extends from the second end portion 48 of the hinge base 42. The vertical axis $a_v$ is defined parallel to the hinge base 42 and runs through the upper striker 32 and the lower hinge 34. The integrated assembly 40 further includes a plurality of fasteners 52, illustrated in the exploded view of the integrated assembly 40 in FIG. 5, for fixing the integrated assembly 40 to a rear-facing end portion of one of the first vertically aligned sidewall 16. The fasteners 52 may be screws, bolts and nuts, rivets, pop rivets, or any suitable fasteners known to those skilled in the art. Alternately, the reverse configuration may be applied, as a matter of design choice, where the integrated assembly 40 is attached to the second vertically aligned sidewall 18.

Figure 8:
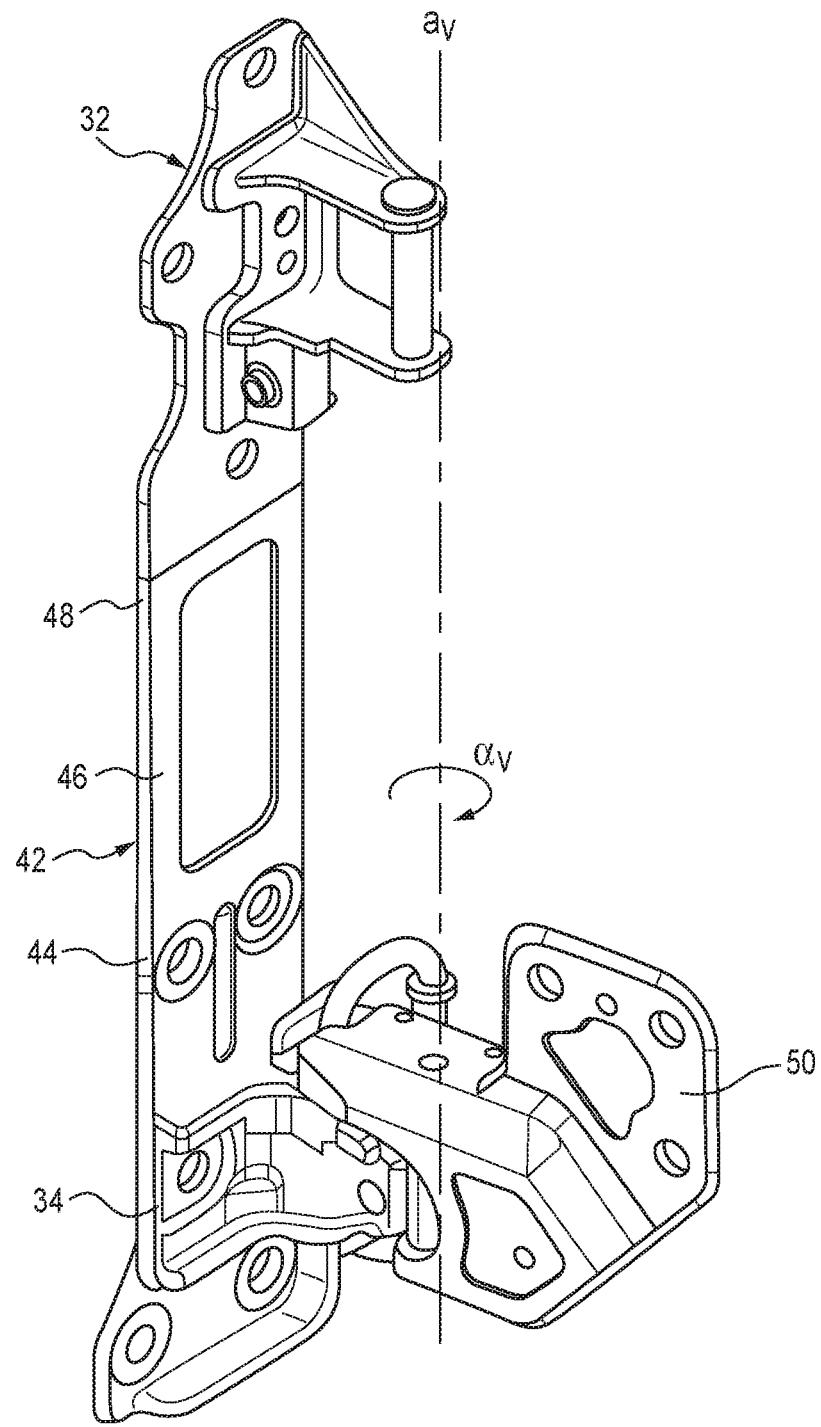
FIG. 8 is a perspective view of a bi-directional hinge rotated about a vertical axis as applied in the view of FIG. 2.
Figure 9:
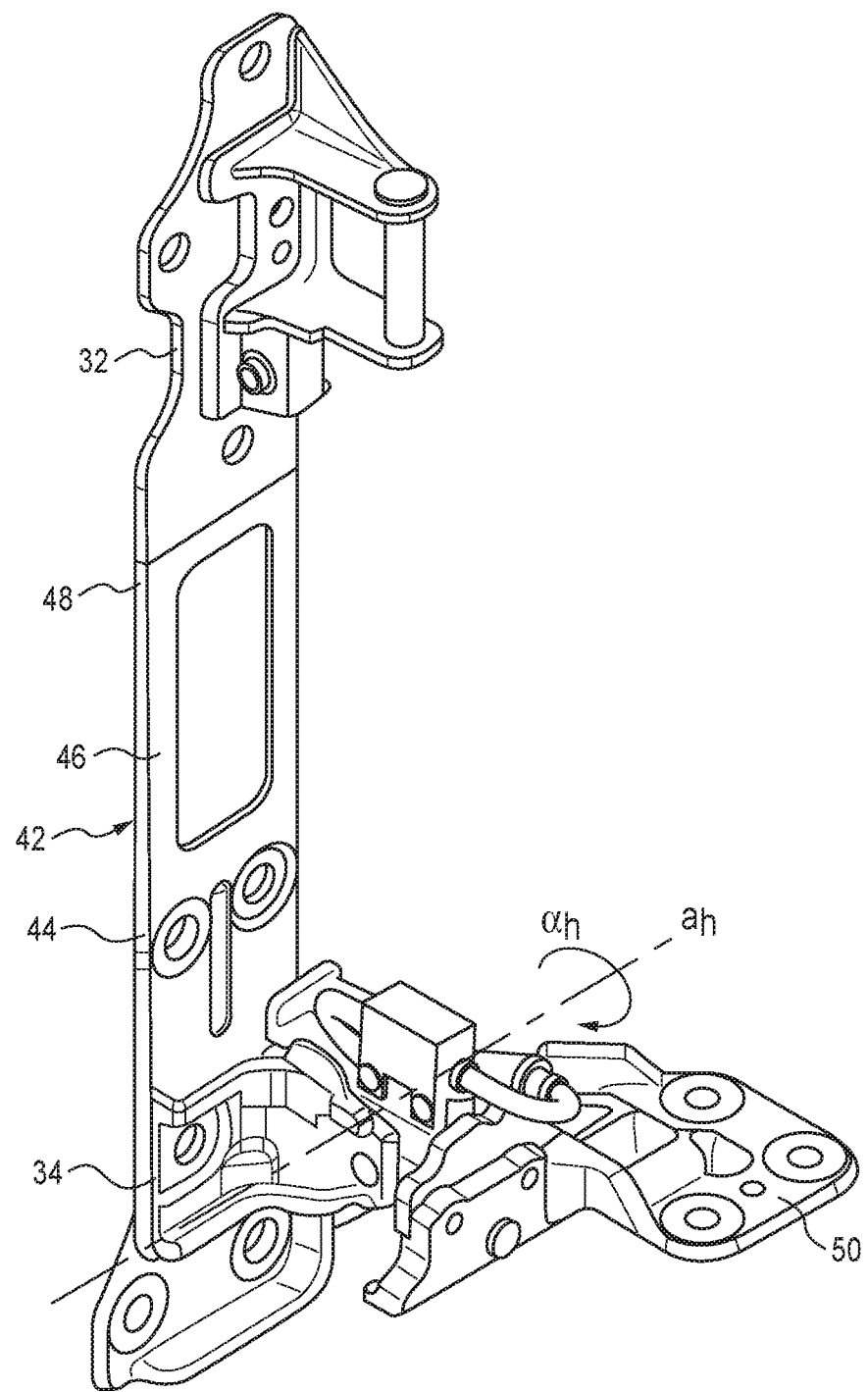
FIG. 9 is a perspective view of the bi-directional hinge rotated about a horizontal axis as applied in the view of FIG. 3.

As illustrated in FIGS. 8-9, the lower hinge 34 may include a bi-directional hinge 50 that is rotatable at an angle $\alpha_v$ about the vertical axis $a_v$ of the integrated assembly 40. Alternately, the bi-directional hinge 50 is rotatable at an angle $\alpha_h$ about the horizontal axis an that bisects the integrated assembly and is though the lower hinge 34 and orthogonal to the vertical axis $a_v$. The bi-directional hinge 50 illustrated in FIG. 8 is rotatable such $\alpha_v$ is approximately 80° about the vertical axis $a_v$ and enables the tailgate 24 to be swung open like a door, as illustrated in FIG. 2. The bi-directional hinge 50 enables the tailgate 18, when the latch is released from the upper striker 32, to be flipped open, as illustrated in FIG. 3, and the bi-directional hinge 50 is rotatable such that $\alpha_h$ is approximately 95° about the horizontal axis $a_h$.

The integrated assembly 40 may be manufactured by forming the upper striker 32, the hinge base 42, and lower hinge 34 together. Alternatively, the integrated assembly 40 by welding the upper striker 32 to the hinge base 42 across the second end portion 48. The lower hinge 34 may also be welded to the hinge base across the first end portion 44. The length of the central portion 46 of the hinge base 42 may be varied to enable the integrated assembly to be applied to vehicles 10 with different sized tailgates 24, such as across different vehicle models or different trim levels or packages of the same vehicle. The integrated assembly may be constructed of steel, stainless steel, aluminum, or any other suitable material or combination of materials known to those skilled in the art.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. An apparatus for attaching a tailgate to a motor vehicle, the motor vehicle having a bed comprising a floor between spaced apart first and second vertically aligned sidewalls, comprising:
   an integrated hinge and striker assembly affixed to one of the first and second vertically aligned sidewalls and connecting the tailgate to the motor vehicle, wherein the integrated hinge and striker assembly comprises:
   a hinge base, the hinge base being vertically aligned with a first end portion, a center portion, and a second end portion;
   a hinge extending from the first end portion of the hinge base;
   a striker extending from the second end portion of the hinge base; and
   wherein a vertical axis is defined parallel to the hinge base and running through the striker and the hinge.

2. The apparatus of claim 1 wherein the hinge of the integrated hinge and striker assembly comprises:
   a bi-directional hinge that alternately is rotatable about the vertical axis and a horizontal axis that bisects the hinge and is orthogonal to the vertical axis.

3. The apparatus of claim 2 wherein the bi-directional hinge is rotatable approximately 80° about the vertical axis.

4. The apparatus of claim 3 wherein the bi-directional hinge is rotatable approximately 95° about the horizontal axis.

5. The apparatus of claim 2 wherein the tailgate includes a latch that engages the striker.

6. The apparatus of claim 5 further comprising:
   a plurality of fasteners fixing the integrated hinge and striker assembly to a rear-facing end portion of one of the first and second vertically aligned sidewalls.

7. A motor vehicle, comprising:
   a bed, the bed comprising:
      first and second vertically aligned sidewalls; and
      a floor spanning between the first and second vertically aligned sidewalls;
   a tailgate attached to the bed and movable between a closed position and a first open position and between the closed position and a second open position; and
   an integrated hinge and striker assembly affixed to the first vertically aligned sidewall and connecting the tailgate to first vertically aligned sidewall, wherein the integrated hinge and striker assembly comprises:
      a hinge base, the hinge base being vertically aligned with a first end portion, a center portion, and a second end portion;
      a hinge extending from the first end portion of the hinge base;
      a striker extending from the second end portion of the hinge base; and
      wherein a vertical axis is defined parallel to the hinge base and running through the striker and the hinge.

8. The motor vehicle of claim 7 wherein the hinge of the integrated hinge and striker assembly comprises:
  a bi-directional hinge that alternately is rotatable about the vertical axis of the integrated hinge and striker assembly and a horizontal axis that bisects the integrated hinge and striker assembly and is orthogonal to the vertical axis.

9. The motor vehicle of claim 8 wherein the bi-directional hinge is rotatable approximately 80° about the vertical axis.

10. The motor vehicle of claim 9 wherein the bi-directional hinge is rotatable approximately 95° about the horizontal axis.

11. The motor vehicle of claim 8 wherein the tailgate includes a latch that engages the striker of the integrated hinge and striker assembly.

12. The motor vehicle of claim 11 wherein the integrated hinge and striker assembly further comprises:
  a plurality of fasteners fixing the integrated hinge and striker assembly to a rear-facing end portion of one of the first and second vertically aligned sidewalls.

13. An integrated hinge and striker assembly affixed to one of a first and second vertically aligned sidewalls of a motor vehicle for connecting a tailgate to the motor vehicle; comprising
  a hinge base, the hinge base being vertically aligned with a first end portion, a center portion, and a second end portion;
  a hinge extending from the first end portion of the hinge base;
  a striker extending from the second end portion of the hinge base; and
  wherein a vertical axis is defined parallel to the hinge base and running through the striker and the hinge.

14. The hinge of the integrated hinge and striker assembly of claim 13 further comprises:
  a bi-directional hinge that alternately is rotatable about the vertical axis and a horizontal axis that bisects the hinge and is orthogonal to the vertical axis.

15. The hinge of the integrated hinge and striker assembly of claim 14 wherein the bi-directional hinge is rotatable approximately 80° about the vertical axis.

16. The hinge of the integrated hinge and striker assembly of claim 15 wherein the bi-directional hinge is rotatable approximately 95° about the horizontal axis.

17. The hinge of the integrated hinge and striker assembly of claim 13 wherein the tailgate includes a latch that engages the striker.

18. The hinge of the integrated hinge and striker assembly of claim 13 further comprising:
  a plurality of fasteners fixing the integrated hinge and striker assembly to a rear-facing end portion of one of the first and second vertically aligned sidewalls.

* * * * *